United States Patent
Lohr

(12) 
(10) Patent No.: US 6,354,979 B1
(45) Date of Patent: Mar. 12, 2002

(54) LIMITED-SLIP DIFFERENTIAL

(75) Inventor: Thomas H. Lohr, Beaver Dam, WI (US)

(73) Assignee: Hoffco/Comet Industries, Inc., Richmond, IN (US)

( * ) Notice: Subject to any disclaimer, the term of this patent is extended or adjusted under 35 U.S.C. 154(b) by 0 days.

(21) Appl. No.: 09/479,260

(22) Filed: Jan. 7, 2000

Related U.S. Application Data

(60) Provisional application No. 60/115,510, filed on Jan. 11, 1999.

(51) Int. Cl.[7] ............................................... F16H 48/22
(52) U.S. Cl. ...................................................... 475/240
(58) Field of Search ................................ 475/231, 234, 475/235, 239, 240, 241

(56) References Cited

U.S. PATENT DOCUMENTS

| | | | | |
|---|---|---|---|---|
| 1,979,414 A | * | 11/1934 | Smith ...................... | 475/239 X |
| 2,997,897 A | * | 8/1961 | Brownyer ................ | 475/241 X |
| 3,390,593 A | * | 7/1968 | Brownyer .................... | 475/240 |
| 4,526,063 A | * | 7/1985 | Oster ...................... | 475/241 X |
| 4,612,825 A | | 9/1986 | Engle | |
| 4,781,079 A | * | 11/1988 | Takahashi .................... | 475/240 |
| 4,978,329 A | | 12/1990 | Yasui et al. | |
| 5,556,344 A | | 9/1996 | Fox | |
| 5,741,199 A | * | 4/1998 | Tanser et al. ........... | 475/240 X |

FOREIGN PATENT DOCUMENTS

| | | | |
|---|---|---|---|
| JP | 08296715 A | * | 11/1996 |
| JP | 09049558 A | * | 2/1997 |

OTHER PUBLICATIONS www, Auburngear.com, Limited–Slip Differentials, six pages, date unknown.
www.csn.ul.ie/~lavelles/difop.html, Materials on Differentials, seven pages, date unknown.
www.engineering.btr.com, BTR Engineering Australia, Transmission & Axle Division, four pages, date unknown.

* cited by examiner

*Primary Examiner*—Charles A. Marmor
*Assistant Examiner*—Ankur Parekh
(74) *Attorney, Agent, or Firm*—Barnes & Thornburg

(57) ABSTRACT

A limited slip differential for driving axles of a vehicle wherein a rotating differential connects the axles to an engine and wherein a torque override assembly is provided to limit relative rotation between the two axles by connecting a spring biased frictional disk drive between the rotational differential and one axle by bolting the input drive to the disks to the rotational differential and keying the output drive of the disks to one of the axles. Varying limits of the torque override is obtained by any one of:

the number of disks used, the material of the disks, and the strength of the spring.

51 Claims, 7 Drawing Sheets

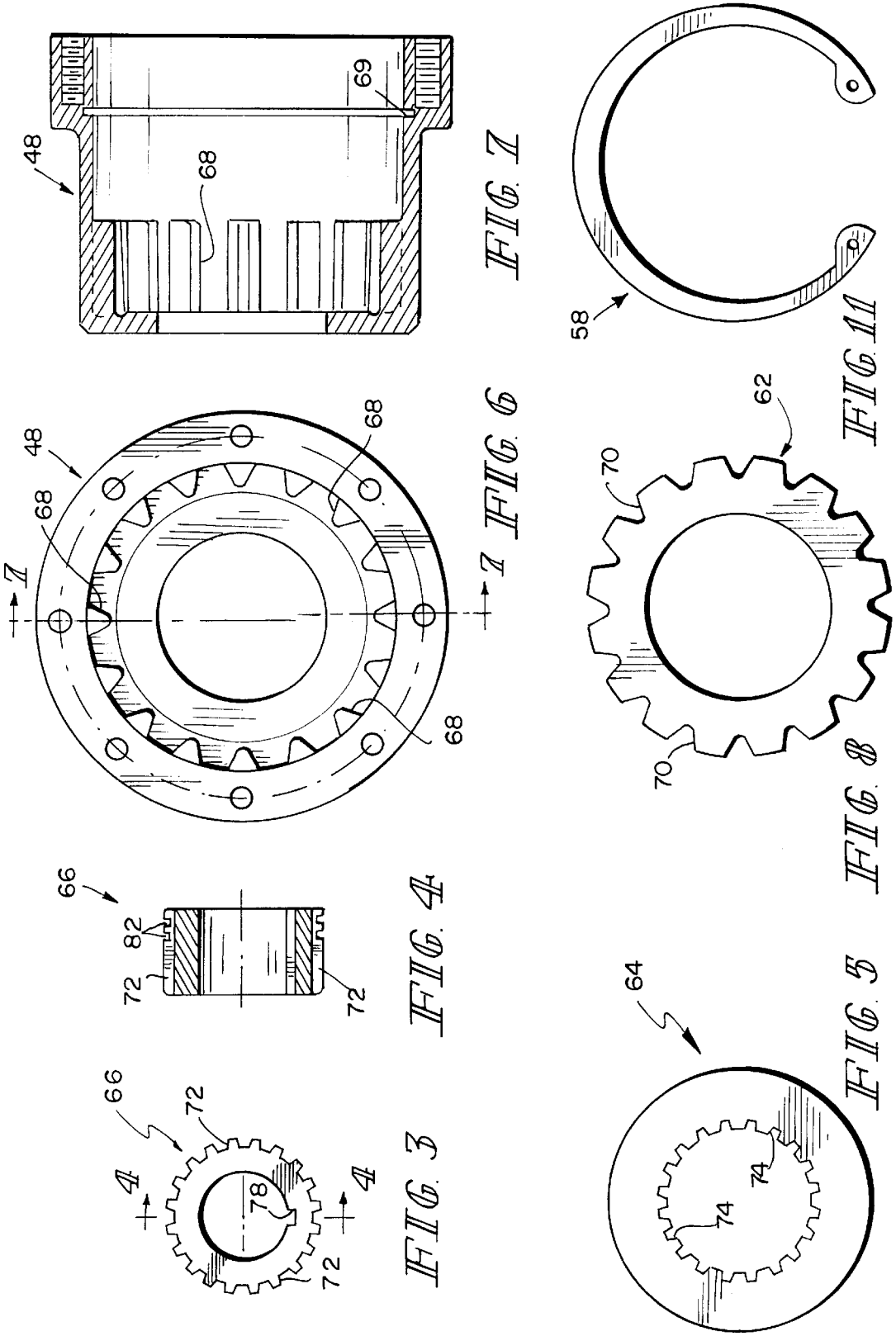

LIMITED-SLIP DIFFERENTIAL

This application claims priority to U.S. Provisional Application Ser. No. 60/115,510, filed Jan. 11, 1999.

BACKGROUND AND SUMMARY OF THE INVENTION

The present invention relates to vehicle drives, and particularly to differentials used in vehicles. More particularly, the present invention relates to limited-slip differentials for transferring drive power to the wheels in a vehicle.

Vehicles include laterally displaced drive wheels. During cornering, the outer drive wheel travels a greater distance than the inner drive wheel. Thus, the outer drive wheel must rotate faster than the inner drive wheel to cover the greater distance. Otherwise, one of the drive wheels will "skid" during cornering.

Differentials are provided on vehicles to permit the outer drive wheel to rotate faster than the inner drive wheel during cornering while both drive wheels continue to receive drive power from the engine. Thus, the outer drive wheel can travel a greater distance than the inner drive wheel while both drive wheels continue to drive the vehicle.

While differentials are useful in cornering, they can allow vehicles to lose traction, for example, in snow or mud or other slick medium. If either of the drive wheels loses traction, it will spin at a high rate of speed and the other wheel will not spin at all. Thus, one drive wheel spins at a high rate of speed without any traction to drive the vehicle; the other drive wheel does not spin; the vehicle receives no driving force from the drive wheels; and the vehicle is stuck.

To help eliminate this drawback of differentials, limited-slip differentials are provided to shift power from the drive wheel that has lost traction and is spinning in the snow or mud to the drive wheel that is not spinning. Thus, while one drive wheel spins in the snow or mud, power is shifted to the other drive wheel by the limited-slip differential to pull or push the vehicle out of the snow or mud.

Features of the present invention will become apparent to those skilled in the art upon consideration of the following detailed description of the invention. The detailed description particularly refers to the accompanying figures in which:

BRIEF DESCRIPTION OF THE DRAWINGS

FIG. 3 is an end elevation view of the hub of FIG. 2 showing the hub formed to include an internal keyway and a plurality of external splines;

FIG. 4 is a cross-sectional view taken along lines 4—4 of FIG. 3 showing the hub of FIG. 2 formed to include a pair of snap-ring grooves;

FIG. 5 is an end elevation view of a drive disk showing the drive disk formed to include a plurality of internal splines that mate with the external splines of the hub;

FIG. 6 is an end elevation view of the housing of the override-torque assembly showing the housing formed to include a plurality of bolt holes and a plurality of internal splines;

FIG. 7 is a cross-sectional view taken along lines 7—7 of FIG. 6 showing the housing of FIG. 6 formed to include a ring groove and the plurality of internal splines;

FIG. 8 is an end elevation view of a friction disk showing the friction disk formed to include a plurality of external splines that mate with the internal splines of the housing of FIG. 6;

FIG. 11 is a side elevation view of the retaining ring;

DETAILED DESCRIPTION OF THE DRAWINGS

Figure 1:
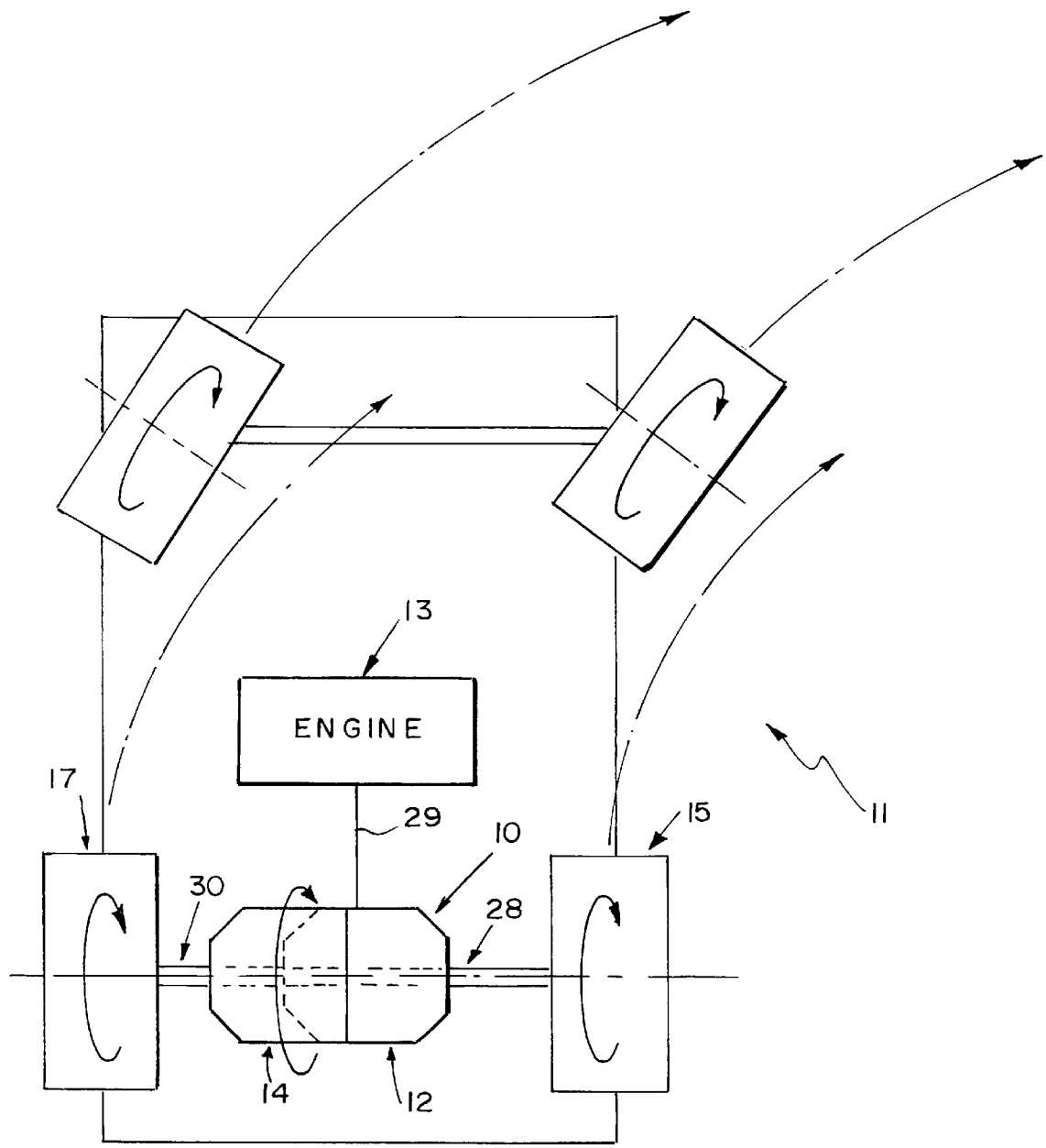
FIG. 1 is a diagrammatic view of a vehicle during cornering around a turn showing the vehicle including right and left front wheels, right and left rear drive wheels, an engine, a limited-slip differential coupled to and receiving power from the engine, and right and left drive shafts coupled to the limited-slip differential and respective right and left drive wheels to transmit power from the limited-slip differential to the right and left drive wheels.

A limited-slip differential 10 is provided for use in a vehicle 11. As shown in FIG. 1, vehicle 11 includes an engine 13, a limited-slip differential 10 coupled to engine 13 to receive power therefrom, right and left shafts 28, 30 coupled to limited slip differential 10 to receive power therefrom, and laterally displaced right and left drive wheels 15, 17 driven by power provided by engine 13 through limited-slip differential 10 and respective right and left shafts 28, 30.

During cornering, limited-slip differential 10 permits the outer wheel (left wheel 17) to rotate faster than the inner wheel (right wheel 15) because the outer wheel must travel a greater distance around the corner than the inner wheel. Otherwise, the wheels may "skid" around the corner. Furthermore, limited-slip differential 10 prevents one of drive wheels 15, 17 from freely rotating or spinning in snow or mud ("free spinning") while the other drive wheel 17, 15, although on a dry surface, is prevented from receiving any power or torque.

Figure 2:
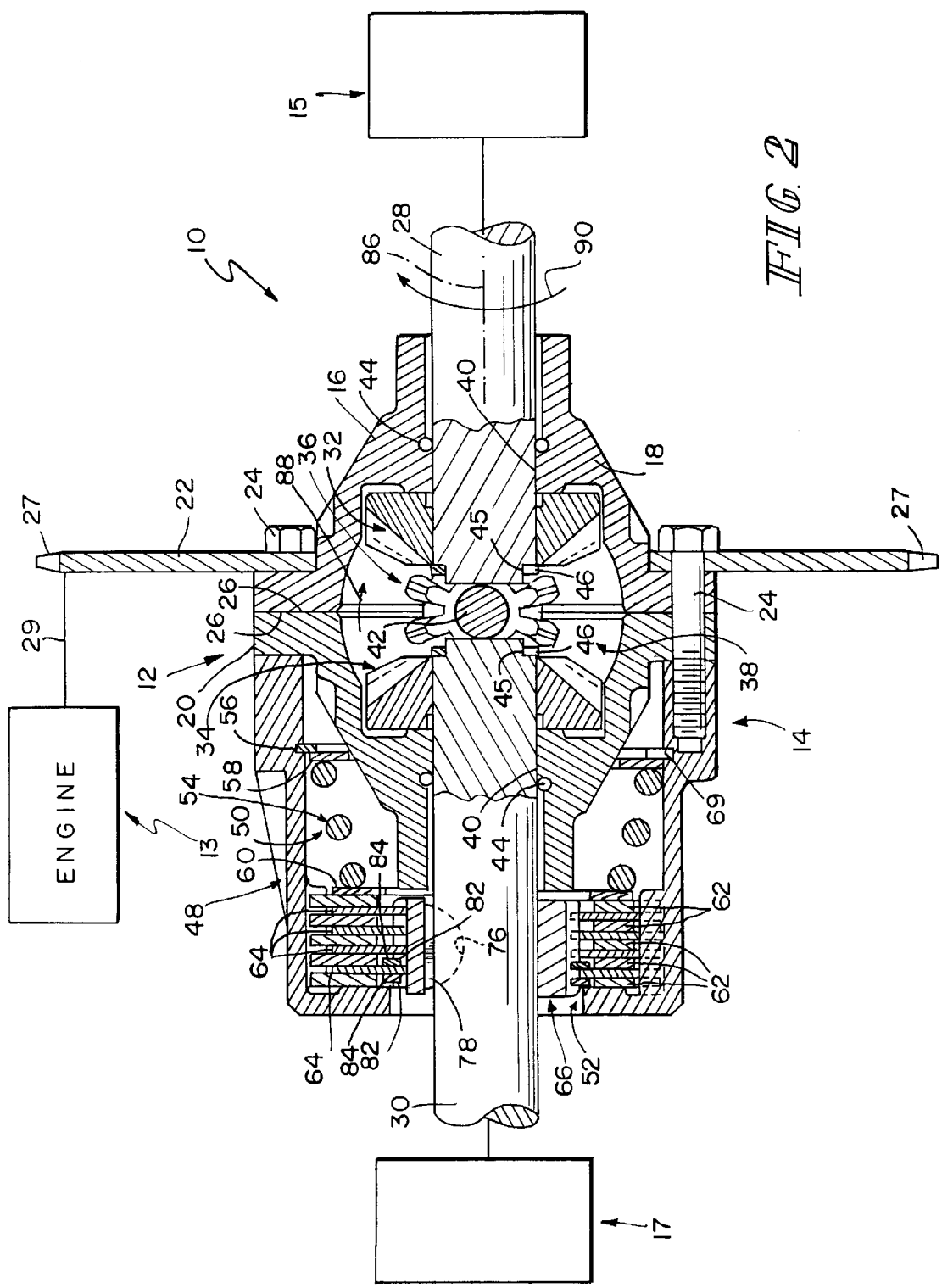
FIG. 2 is a cross-sectional view of the limited-slip differential showing the limited-slip differential including a sprocket coupled to the engine, a symmetric differential assembly coupled to the sprocket, an override-torque assembly coupled to a left half of the differential assembly, the right shaft coupled to the right drive wheel and extending into a right half of the differential assembly, the left shaft coupled to the left drive wheel and extending into the override-torque assembly and the left half of the differential assembly, and the override-torque assembly including a hub coupled to the left shaft, a plurality of drive disks coupled to the hub, a plurality of friction disks positioned to lie adjacent the drive disks, a housing surrounding and coupled to the friction disk, a spring biasing the disks, and a retaining ring positioned to lie in a groove formed in the housing.
Figure 9:
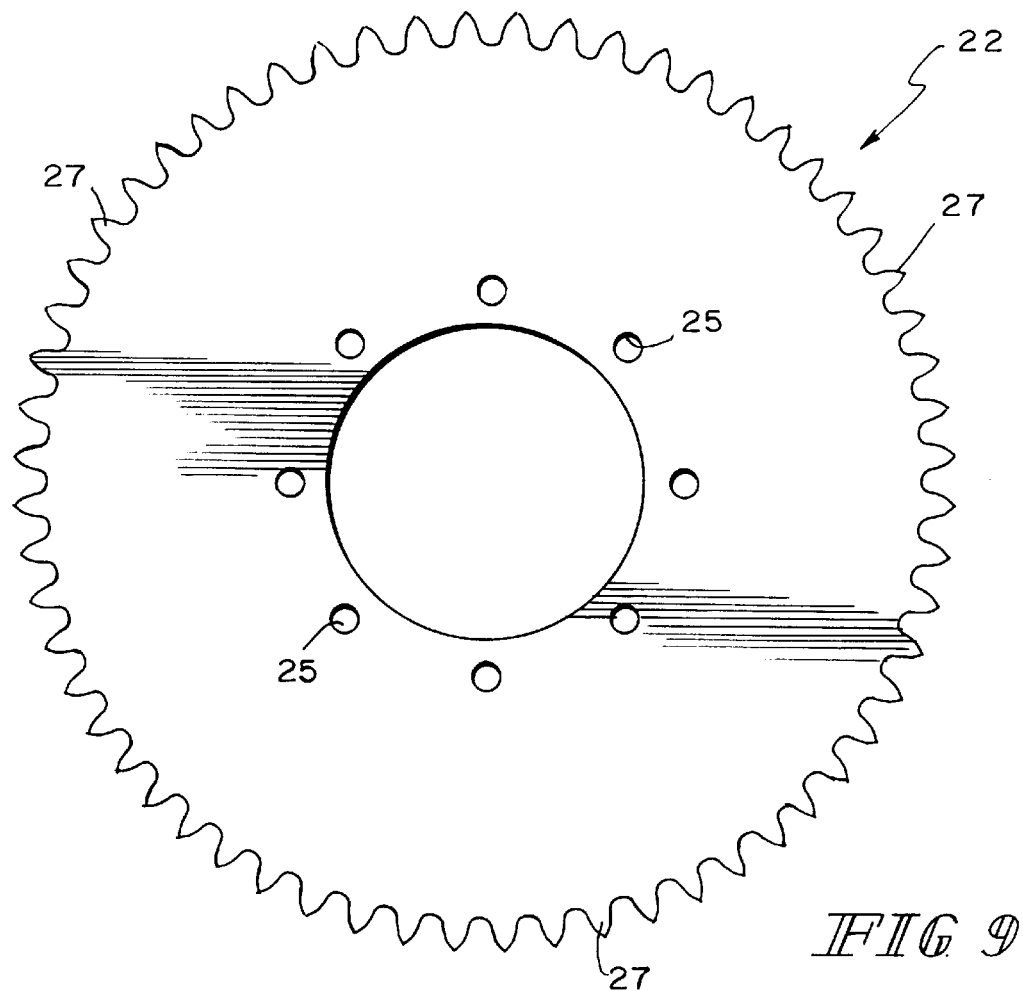
FIG. 9 is an end elevation view of the sprocket showing the sprocket formed to includes a plurality of bolt holes and a plurality of teeth.
Figure 10:
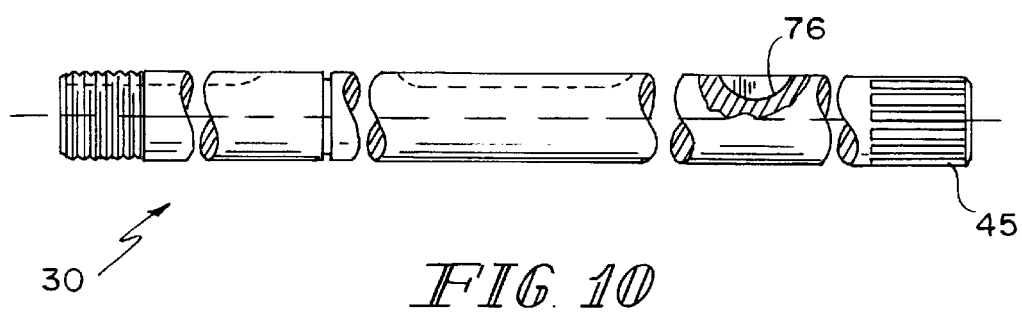
FIG. 10 is a side elevation view of the left shaft, with portions broken away, showing the left shaft formed to include a keyway.

As shown in FIG. 2, limited-slip differential 10 is formed to include a differential assembly 12 and a override-torque assembly 14 coupled to differential assembly 12. Differential assembly 12 permits right and left drive wheels 15, 17 to rotate at different speeds during cornering while receiving power from engine 13. Override-torque assembly 14 prevents one of drive wheels 15, 17 from free spinning while the other drive wheel 17, 15 is prevented from receiving any power or torque.

Differential assembly 12 permits right and left shafts 28, 30 to rotate at different rates so that respective right and left wheels 15, 17 also rotate at different rates. Differential assembly 12 rotates as a result of the power provided by engine 13 and right and left shafts 28, 30 rotate as a result of the rotation of differential assembly 12. Differential assembly 12 includes a set of gears that slow down either one of the shafts 28,30 relative to differential assembly 12 when the other one of shafts 30, 28 speeds up. This slowing of one of shafts 28, 30 relative to the other of shafts 30, 28 permits wheels 15, 17 to rotate at different rates than each other and corner without skidding or shimmying. Likewise, when right and left shafts 28, 30 rotate at different rates than each other, they rotate at rates different than differential assembly 12.

Override-torque assembly 14 controls the relative rotation of differential assembly 12 and left shaft 30 to reduce or eliminate free spinning of either shaft 28, 30 while the other shaft 28, 30 fails to spin. During cornering, or other situations in which right and left shafts 28, 30 rotate at different speeds such as free spinning, right and left shafts 28, 30 rotate relative to differential assembly 12. When vehicle 11 is driving straight, right and left shafts 28,30 rotate at the same speeds unless one of the wheels 15, 17 is free-spinning. To prevent free-spinning, torque-override assembly 14 introduces enough resistance to relative rotation between differential assembly 12 and left shaft 30 to prevent free spinning, yet permit cornering. This resistance to relative rotation between differential assembly 12 and left shaft 30 is provided by introducing override-torque in the form of torsional friction between left shaft 30 and differential assembly 12.

Differential assembly 12 includes a housing 16, a sprocket 22 coupled to housing 16 and engine 13 to transfer power from engine 13 to housing 16, and a plurality of bolts 24 that couple sprocket 22 to housing 16 as shown in FIG. 2. Housing 16 includes a right half 18, a left half 20, and a plurality of bolt holes 21. Left and right halves 20, 18 include inner surfaces 26 that face each other and are sealed with LOCTITE® 515 sealant to prevent debris from entering housing 16. Sprocket 22 is formed to include a plurality of bolt holes 25 and a plurality of teeth 27. Bolts 24 are positioned to lie in bolt holes 25 of sprocket 22 and bolt holes 21 of housing 16 to couple sprocket 22 and right and left halves 18, 20 together as shown in FIG. 2. Teeth 27 mesh with a chain (not shown) coupled to engine 13 to transfer power to differential assembly 12.

Differential assembly 12 further includes a right side gear 32 coupled to right shaft 28, a left side gear 34 coupled to left shaft 30, a pair of pinion gears 36 (one not shown) and a pair of pinion shafts 42 (one not shown) coupled to pinion shaft 42 to permit pinion gears 36 to rotate relative to housing 16. Pinion gears 36 mesh with right and left side gears 32, 34 to enable right and left shafts 28, 30 to rotate at different speeds.

Housing 16 is formed to include an interior region 38, a pair of shaft-receiving passageways 40, and a pinion shaft-receiving passageway (not shown). Interior region 38 houses gears 32, 34, 36. The pair of shaft-receiving passageways 40 permit right and left shafts 28, 30 to pass through housing 16 and drive respective right and left drive wheels 15, 17 as shown in FIG. 2. The pinion shaft-receiving passageway receives pinion shaft 42 to permit pinion gear 36 to spin relative to housing 16.

Differential assembly 12 further includes a pair of sealing rings 44 positioned to lie between right and left halves 18, 20 and respective right and left shafts 28, 30 to prevent debris from entering interior region 38 and to retain gear lubricant (not shown) within housing 16. Right and left shafts 28, 30 are formed to include grooves 45 and snap-rings 46 are snapped within grooves 45 to secure respective right and left side gears 32, 34 on right and left shafts 28, 30 as shown in FIG. 2.

Override-torque assembly 14 includes components that create the torsional friction (override torque) between housing 16 of differential assembly 12 and left shaft 30 to control the relative rotation between left shaft 30 and differential assembly 12.

Override-torque assembly 14 includes a housing 48 coupled to housing 16 of differential assembly 12 by bolts 24, a hub 66 coupled to left shaft 30, a plurality of friction disks 62 coupled to housing 48, a plurality of drive disks 64 positioned to lie between friction disks 62 and coupled to hub 66 to provide override torque between housing 48 and friction disks 62, and a spacer 60. Thus, left shaft 30, hub 66, and drive disks 64 are constrained to rotate together; housing 16 of differential assembly 12, housing 48 of override-torque assembly 14, and friction disks 62 are constrained to rotate together; and friction disks 62 and drive disks 64 create override torque between one another and between left shaft 30 and differential assembly 12.

Override-torque assembly 14 includes components that provide normal force between friction and drive disks 62, 64 to create the friction between friction and drive disks 62, 64 that results in the override torque. Override-torque assembly 14 further includes a conical spring 54 positioned to lie adjacent spacer 60 to push against spacer 60 and provide the normal force between friction and drive disks 63, 64, a spring ring 56 coupled to housing 48, and a retaining ring 58 positioned to lie between spring ring 56 and spring 54 to retain spring 54 and friction and drive disks 62, 64 within housing 48 as shown, for example, in FIG. 2.

Housing 48 is formed to include a plurality of internal splines 68 and a ring groove 69, as shown in FIGS. 6 and 7. Friction disks 62 are formed to include a plurality of external splines 70, as shown in FIG. 8, that mate with internal splines 68 of housing 48 to constrain friction disks 62 to rotate with housing 48. Hub 66 is formed to include a plurality of external splines 72, as shown in FIGS. 3 and 4, and drive disks 64 are formed to include a plurality of internal splines 74, as shown in FIG. 5, that mate with external splines 72 of hub 66 to constrain friction disks 64 in rotation with housing 48. Therefore, friction disks 62 and housing 48 are constrained to rotate together and drive disks 64 and hub 66 are constrained to rotate together.

Left shaft 30 is formed to include a woodruff keyway 76 and hub 66 is formed to include an internal keyway 78. Right shaft 28 does not include a woodruff keyway, but is otherwise identical to left shaft 30. A woodruff key 80 is positioned to lie within woodruff keyway 76 and internal keyway 78 to constrain hub 66 in rotation with left shaft 30. Hub 66 is further formed to include a pair of snap-ring grooves 82 and override-torque assembly 12 further includes a pair of snap rings 84 positioned to lie in snap-ring grooves 82 with a drive disk 64 positioned to lie therebetween as shown in FIG. 2. Therefore, drive disk 64 is constrained to move along an axial path relative to left shaft 30.

In operation, engine 13 drives a chain 29 that meshes with teeth 27 of sprocket 22 and drives sprocket 22 about an axis of rotation 86. Sprocket 22 rotates housing 16 of differential assembly 12 and housing 48 of override-torque assembly 14. In response to the rotation of housing 16 of differential assembly 12, right and left shafts 28, 30 rotate as shown in FIG. 1. If the vehicle is traveling in a straight direction, each shaft 28, 30 rotates at the same speed as the other shaft 30, 28 and at the same speed as housing 16. However, if the vehicle is cornering, each shaft 28, 30 will rotate at a different speed and at a different speed than housing 16.

The differential turning rates of right and left shafts 28, 39 are the results of the interaction of pinion gear 36 and right and left side gears 32, 34. For example, if housing 16 is spinning at a rate X and right side gear 32 is spinning at a speed X+A, left shaft 30 will rotate at speed X−A. Thus, as the rotational speed of right shaft 28 increases or decreases by speed A relative to housing 16, the rotational speed of left shaft 30 will respectively decrease or increase by speed A relative to housing 16 and by speed 2A relative to right shaft 28.

The inverse relationship in relative speed between right shaft 28 and left shaft 30 exists because of the placement of pinion gear 36 between right and left side gears 32, 34. For example, if pinion gear 36 rotates in a clockwise direction 88, right shaft 28 will spin faster in a direction 90 about axis 86 and left shaft 28 will spin slower in direction 90 about axis 86. Thus, if housing 16 is turning in direction 90, right shaft 28 will spin faster than housing 16 about axis 86 in direction 90 and left shaft 30 will spin slower than housing 16 about axis 86 in direction 90. For example, if housing 16 is spinning at 50 rotations per minute (RPM) in direction 90 and right shaft 28 is spinning at 55 RPM in direction 90 (5 RPM relative housing 16 in direction 90), left shaft 30 will spin at 45 RPM in direction 90 (−5 RPM relative housing 16 in direction 90).

If, for example, right wheel 15 (coupled to right shaft 28) is stuck in mud or is positioned on ice, right wheel 15 will begin to slip and free spin. As right shaft 28 increases its speed, left shaft 30 will decrease in speed until left shaft 30 is no longer turning and right shaft 28 is turning at a rate twice that of housing 16. Vehicle 11 will receive no drive force in this situation and will become stuck.

Torque-override assembly 14 helps eliminate or reduce this problem by introducing a predetermined amount of override torque between left shaft 30 and housing 16 that must be overcome before right and left shafts 28, 30 begin to rotate at different speeds. Thus, in order for one of wheels 15, 17 to spin free, the other of wheels 17, 15 must receive some torque and power. Friction disks 62, drive disks 64, and spring 54 cooperate to provide this override torque by introducing friction between housings 48, 16 and left shaft 30. Because spring 54 biases friction disks 62 against drive disks 64, an amount of normal force exists between friction disks 62 and drive disks 64. Thus, in order to turn drive disks 64 relative to friction disks 62 (and left shaft 30 relative to differential assembly 12), an amount of torsional friction must be overcome. This amount of torsional friction is the override torque.

The magnitude of the override torque is a design parameter. Each vehicle design may require a different override torque for optimal performance or a single design may require a different override torque corresponding to specific driving conditions. The amount of frictional torque or override torque is dependent on the spring constant of spring 54, the number of friction disks 62 and drive disks 64, and the material characteristics of friction disks 62 and drive disks 64. Normally the drive disks would be of material different than the friction disks. Either the outer or inner disk could be made of a friction material. If a higher spring constant is chosen, the override torque will be higher. Thus, by changing the spring constant of spring 54, the magnitude of the required override torque can be specified.

If the number of friction and drive disks 62, 64 is increased, spring 54 will compress to a greater extent and the spring force against friction and drive disks 62, 64 will increase. This increases the friction between friction disk 62 and drive disk 64 and increase the magnitude of the required override torque. Thus, by selecting the number of friction disks 62 and drive disks 64, the magnitude of the required override torque can be specified.

If materials for friction disks 62 and drive disks 64 are selected having higher coefficients of friction, a greater magnitude of override torque will be required before right and left shafts 28, 30 will rotate relative to housings 48, 16. Thus, by selecting the specific material types for friction disk 62 and drive disks 64, the magnitude of the required override torque can be specified. Thus, a wide range of magnitude of override torques can be specified by changing the spring constant of spring 54, selecting a different number of friction and drive disks 62,64, or changing the material comprising either friction disks 62 or drive disks 64.

Figure 12:
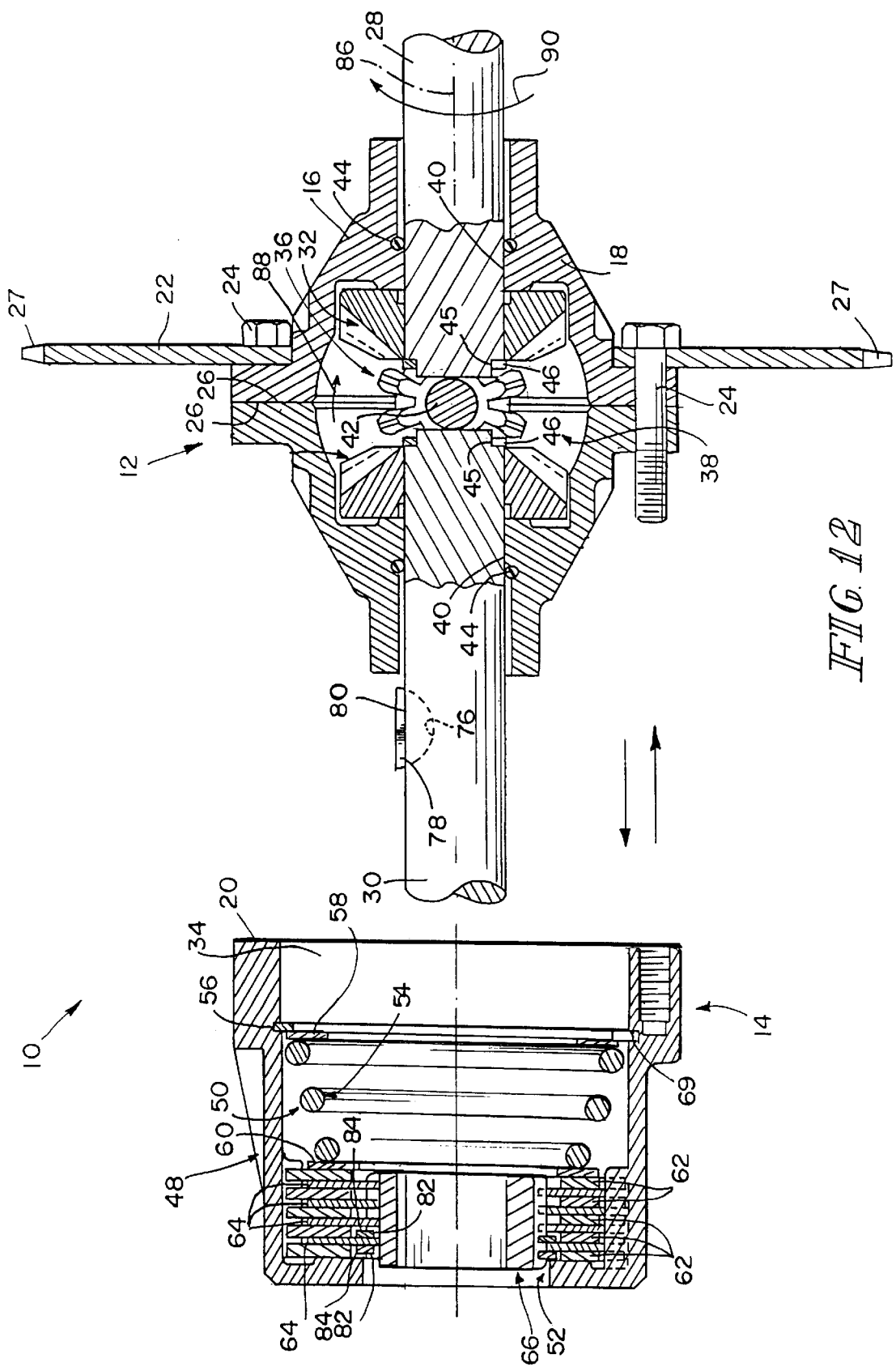
FIG. 12 is a cross-sectional view of the limited-slip differential similar to FIG. 2 showing the override-torque assembly separated from the differential assembly.

Override-torque assembly 14 is easily removable from differential assembly 12 by simply "backing out" bolts 24 until housing 48 is uncoupled from housing 16 as shown in FIG. 12. When removed, the number of friction and drive disks 62, 64 can be changed; spring 54 can be removed and another friction and/or drive disk can be added having different frictional characteristics; or spring 54 can be removed and different spring can be placed in override-torque assembly 14 that produces different override-torque values.

Figure 13:
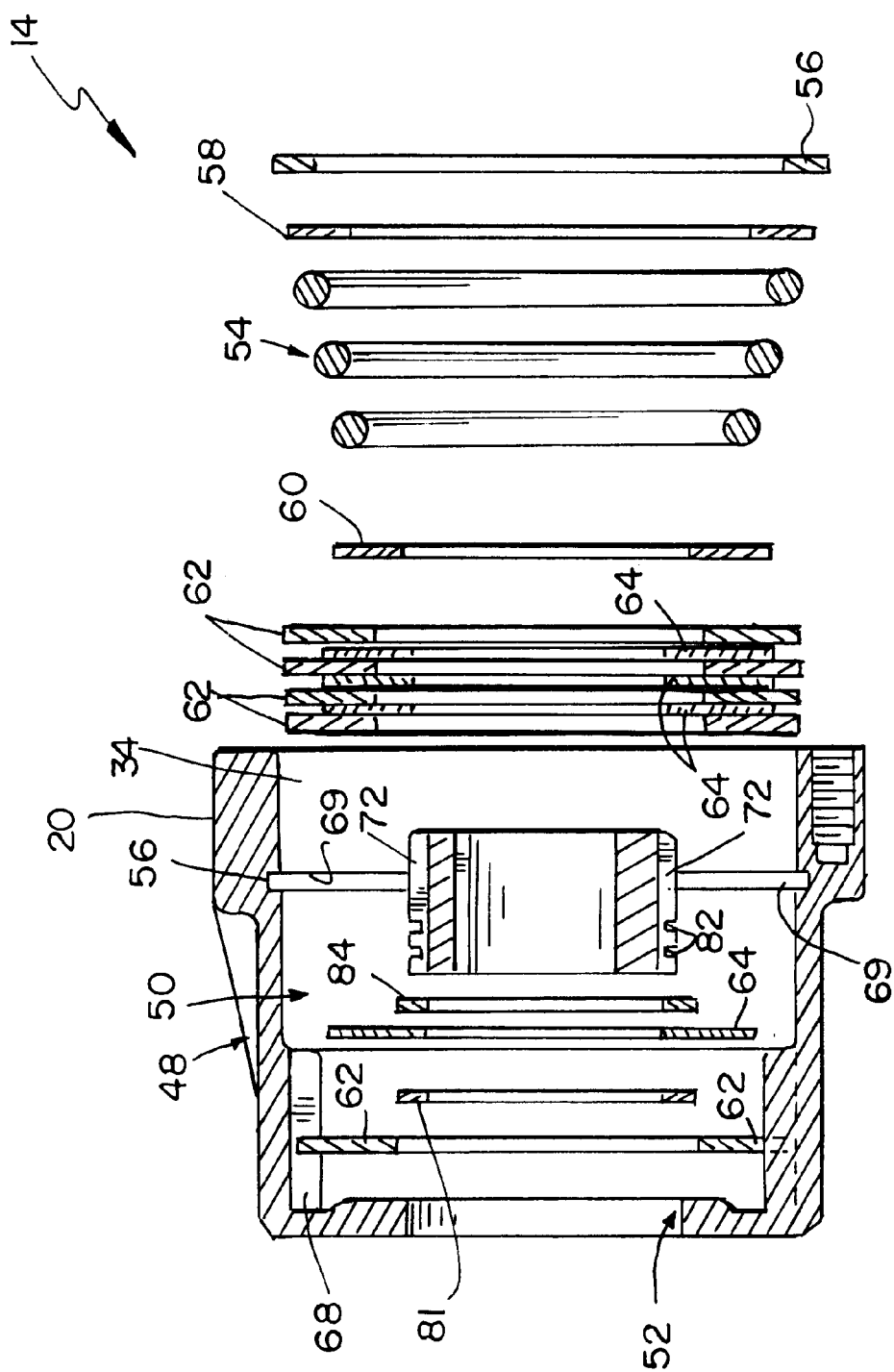
FIG. 13 is a cross-sectional view of the override-torque assembly similar to FIG. 12 showing the components of the override-torque assembly separated for reconfiguration or replacement.

To change these components, retaining ring 58 is removed with a pair of snap-ring pliers (not shown) so that spring 54 and friction and drive disks 62, 64 can be removed from housing 16 as shown in FIG. 13. Friction and drive disks 62, 64 can be added, removed, or replaced and restacked and positioned to lie in housing 16 behind spring 54. Retaining ring 58 is then snapped back into ring groove 69 to secure spring 54 and friction and drive disks 62, 64 within housing 48. Override-torque assembly 14 is then recoupled to differential assembly 12 by bolts 24. Vehicle 11 can also be operated with override-torque assembly 14 removed from differential assembly 12. This is preferable in situations where override torque is unnecessary or undesirable. Thus, override-torque assembly 14 is easily removable and easily configurable.

Figure 14:
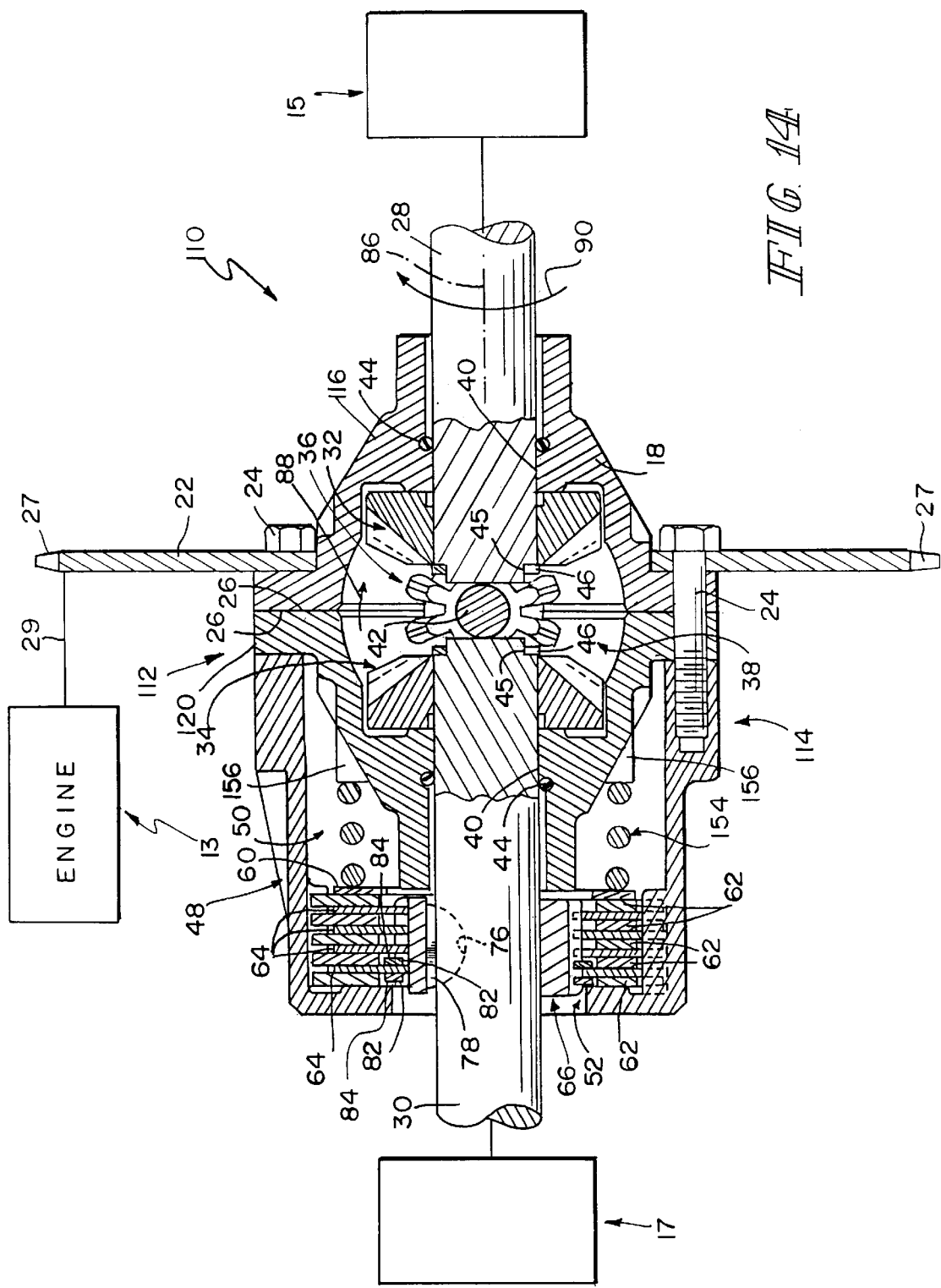
FIG. 14 is a cross-sectional view of an alternative embodiment limited-slip differential substantially similar to the limited-slip differential of FIG. 2 showing the alternative embodiment limited-slip differential including a differential assembly including a housing and an override-torque assembly coupled to a left half of the housing of the differential assembly, the override-torque assembly including a cylindrical spring mounted on a pair of lugs formed in the left half of the housing of the differential assembly.

An alternative embodiment limited-slip differential 110 is shown in FIG. 14. Limited-slip differential 110 includes a differential assembly 112 and a override-torque assembly 114 that are substantially similar to differential assembly 12 and override-torque assembly 14 of limited-slip differential 10. Identical reference numbers are used to designate identical parts between limited-slip differential 10 and limited-slip differential 110.

Differential assembly 112 includes a housing 116 including a left half 120 and a right half 18. Left half 120 is formed to include a plurality of lugs 156. Override-torque assembly 114 includes a cylindrical spring 154 that is positioned to lie on lugs 156 to bias friction and brake disks 62, 64. Furthermore, these components 62, 64 can be replaced for wear and tear in the same manner. Then, override-torque assembly 114 is slid back on left shaft 30 and bolts 24 tightened to reinstall the newly configured override-torque assembly 114.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A limited slip differential comprising:

a differential housing;

a power input for rotating said differential housing;

a first and a second differential gear located within said differential housing and drivingly connected between the rotational differential housing and respective first and second output shafts that extend outwardly of the differential housing to transfer rotation of the differential housing to said output shafts;

at least one pinon gear within said differential housing drivingly connected between said first and second gears to permit relative rotation between said first and second output shafts;

an override torque assembly located externally to the rotating differential housing including an outer housing secured to the rotating differential housing independently of the output shafts;

said override torque assembly connecting the rotating differential housing to one of the output shafts through a frictional drive arrangement to limit the relative rotation between the first and second output shafts.

2. A limited slip differential comprising:

a differential housing;

a power input for rotating said differential housing;

a first and a second differential gear located within said differential housing and drivingly connected between the rotational differential housing and respective first and second output shafts that extend outwardly of the differential housing to transfer rotation of the differential housing to said output shafts;

at least one pinon gear within said differential housing drivingly connected between said first and second gears to permit relative rotation between said first and second output shafts;

an override torque assembly located externally to the rotating differential housing; said override torque assembly connecting the rotating differential housing to one of the output shafts through a frictional drive arrangement to limit the relative rotation between the first and second output shafts;

wherein the frictional drive arrangement comprises:

an outer housing drivingly connected to the rotating differential housing and including:

a rotating member drivingly connected to the one output shaft; and a frictional drive between the outer housing and the rotating member, wherein the driving connection between the driven member and the rotating differential housing is obtained by bolting the outer housing to the rotating differential housing.

3. The limited slip differential of claim 2, wherein the frictional drive arrangement comprises at least two friction disks and one drive disk spring biased against one another.

4. The limited slip differential of claim 3 wherein the override torque assembly provides a plurality of different limited relative rotations between the first and second output shafts dependent upon the number of frictional disks in the drive between the outer housing and the rotating member.

5. The limited slip differential of claim 3 wherein the override torque assembly provides a plurality of different limited relative rotations between the first and second output shafts dependent upon the material characteristics of the frictional disks in the drive between the outer housing and the rotating member.

6. The limited slip differential of claim 3 wherein the override torque assembly provides a plurality of different limited relative rotations between the first and second output shafts dependent upon the strength of the spring biasing the frictional disks in the drive between the outer housing and the rotating member.

7. The limited slip differential of claim 2 wherein the frictional drive arrangement comprises at least two friction disks and one drive disk spring biased against one another.

8. The limited slip differential of claim 7 wherein the override torque assembly provides a plurality of different limited relative rotations between the first and second output shafts dependent upon the number of frictional disks in the drive between the outer housing and the rotating member.

9. The limited slip differential of claim 7 wherein the override torque assembly provides a plurality of different limited relative rotations between the first and second output shafts dependent upon the material characteristics of the frictional disks in the drive between the outer housing and the rotating member.

10. The limited slip differential of claim 7 wherein the override torque assembly provides a plurality of different limited relative rotations between the first and second output shafts dependent upon the strength of the spring biasing the frictional disks.

11. The limited slip differential of claim 2 wherein the frictional drive arrangement comprises at least two friction disks and one drive disk spring biased against one another.

12. The limited slip differential of claim 11 wherein the override torque assembly provides a plurality of different limited relative rotations between the first and second output shafts dependent upon the number of frictional disks in the drive between the outer housing and the rotating member.

13. The limited slip differential of claim 11 wherein the override torque assembly provides a plurality of different limited relative rotations between the first and second output shafts dependent upon the material characteristics of the frictional disks in the drive between the outer housing and the rotating member. in the drive between the outer housing and the rotating member.

14. The limited slip differential of claim 11 wherein the override torque assembly provides a plurality of different limited relative rotations between the first and second output shafts dependent upon the strength of the spring biasing the frictional disks in the drive between the outer housing and the rotating member.

15. A limited slip differential comprising:

a rotating differential drivingly connected between two output shafts and a single rotating input; and an override torque assembly located externally to the rotating differential including an outer housing secured to the rotating differential independently of the output shafts comprising:

a frictional drive between the rotating differential and one of the two output shafts;

wherein the frictional drive is provided by at least two frictional disks and a drive disk spring biased against one another; and wherein at least one of the at least two frictional disks and drive disk is drivingly connected to the rotating differential housing and another of the at least two fictional disks and drive disk is drivingly connected to the one of the output shafts.

16. The limited slip differential of claim 15 wherein the override torque assembly provides a plurality of different limited relative rotations between the first and second output shafts dependent upon the number of frictional disks in the drive between the driven and rotating members.

17. The limited slip differential of claim 15 wherein the override torque assembly provides a plurality of different limited relative rotations between the first and second output shafts dependent upon the material characteristics of the frictional disks in the drive between the driven and rotating members.

18. The limited slip differential of claim 15 wherein the override torque assembly provides a plurality of different limited relative rotations between the first and second output shafts dependent upon the strength of the spring biasing the frictional disks in the drive between the driven and rotating members.

19. A limited slip differential comprising:
   a differential housing;
   a power input for rotating said differential housing;
   a first and a second differential gear located within said differential housing and drivingly connected between the rotational differential housing and respective first and second output shafts that extend outwardly of the differential housing to transfer rotation of the differential housing to said output shafts;
   at least one pinon gear within said differential housing drivingly connected between said first second gears to permit relative rotation between said first and second output shafts;
   an override torque assembly located externally to the rotating differential housing;
   said override torque assembly connected the rotating differential housing to one of the output shafts through a frictional drive arrangement including a spring arrangement consisting essentially of a single conical spring to limit the relative rotation between the first and second output shafts.

20. The limited slip differential of claim 19 wherein the frictional drive arrangement comprises:
   a driven member drivingly connected to the rotating differential housing:
   a rotating member drivingly connected to the one output shaft; and
   a frictional drive between the driven and rotating members.

21. The limited slip differential of claim 20 wherein the driving connection between the driven member and the rotating differential housing is obtained by bolting the driven member to the rotating differential housing.

22. The limited slip differential of claim 21 wherein the frictional drive arrangement comprises at least two friction disks and one drive disk spring biased against one another.

23. The limited slip differential of claim 22 wherein the override torque assembly provides a plurality of different limited relative rotations between the first and second output shafts dependent upon the number of frictional disks in the drive between the driven and rotating members.

24. The limited slip differential of claim 22 wherein the override torque assembly provides a plurality of different limited relative rotations between the first and second output shafts dependent upon the material characteristics of the frictional disks in the drive between the driven and rotating members.

25. The limited slip differential of claim 22 wherein the override torque assembly provides a plurality of different limited relative rotations between the first and second output shafts dependent upon the strength of the spring biasing the frictional disks in the drive between the driven and rotating members.

26. The limited slip differential of claim 20 wherein the frictional drive arrangement comprises at least two friction disks and one drive disk spring biased against one another.

27. The limited slip differential of claim 26 wherein the override torque assembly provides a plurality of different limited relative rotations between the first and second output shafts dependent upon the number of frictional disks in the drive between the driven and rotating members.

28. The limited slip differential of claim 26 wherein the override torque assembly provides a plurality of different limited relative rotations between the first and second output shafts dependent upon the material characteristics of the frictional disks in the drive between the driven and rotating members.

29. The limited slip differential of claim 26 wherein the override torque assembly provides a plurality of different limited relative rotations between the first and second output shafts dependent upon the strength of the spring biasing the frictional disks in the drive between the driven and rotating members.

30. The limited slip differential of claim 19 wherein the frictional drive arrangement comprises at least two friction disks and one drive disk spring biased against one another.

31. The limited slip differential of claim 30 wherein the override torque assembly provides a plurality of different limited relative rotations between the first and second output shafts dependent upon the number of frictional disks in the override torque assembly.

32. The limited slip differential of claim 30 wherein the override torque assembly provides a plurality of different limited relative rotations between the first and second output shafts dependent upon the material characteristics of the frictional disks in the override torque assembly.

33. The limited slip differential of claim 30 wherein the override torque assembly provides a plurality of different limited relative rotations between the first and second output shafts dependent upon the strength of the spring in the override torque assembly.

34. The limited slip differential of claim 1 wherein the frictional drive arrangement comprises:
   the outer housing which is drivingly connected to the rotating differential housing;
   a rotating member drivingly connected to the one output shaft; and
   a frictional drive between the outer housing and the rotating member.

35. The limited slip differential of claim 34 wherein the driving connection between the outer housing and the rotating differential housing is obtained by bolting the outer housing to the rotating differential housing.

36. The limited slip differential of claim 35 wherein the frictional drive arrangement comprises at least two friction disks and one drive disk spring biased against one another.

37. The limited slip differential of claim 36 wherein the override torque assembly provides a plurality of different limited relative rotations between the first and second output shafts dependent upon the number of frictional disks in the drive between the outer housing and the rotating member.

38. The limited slip differential of claim 36 wherein the override torque assembly provides a plurality of different limited relative rotations between the first and second output shafts dependent upon the material characteristics of the frictional disks in the drive between the outer housing and the rotating member.

39. The limited slip differential of claim 36 wherein the override torque assembly provides a plurality of different limited relative rotations between the first and second output shafts dependent upon the strength of the spring biasing the frictional disks in the drive between the outer housing and rotating member.

40. The limited slip differential of claim 34 wherein the frictional drive arrangement comprises at least two friction disks and one drive disk spring biased against one another.

41. The limited slip differential of claim 40 wherein the override torque assembly provides a plurality of different limited relative rotations between the first and second output shafts dependent upon the number of frictional disks in the drive between the outer housing and the rotating member.

42. The limited slip differential of claim 40 wherein the override torque assembly provides a plurality of different limited relative rotations between the first and second output shafts dependent upon the material characteristics of the frictional disks in the drive between the outer housing and the rotating member.

43. The limited slip differential of claim 40 wherein the override torque assembly provides a plurality of different limited relative rotations between the first and second output shafts dependent upon the strength of the spring biasing the frictional disks in the drive between the outer housing and rotating member.

44. The limited slip differential of claim 1 wherein the frictional drive arrangement comprises at least two friction disks and one drive disk spring biased against one another.

45. The limited slip differential of claim 41 wherein the override torque assembly provides a plurality of different limited relative rotations between the first and second output shafts dependent upon the number of frictional disks in the drive between the outer housing and the rotating member.

46. The limited slip differential of claim 44 wherein the override torque assembly provides a plurality of different limited relative rotations between the first and second output shafts dependent upon the material characteristics of the frictional disks in the drive between the outer housing and the rotating member.

47. The limited slip differential of claim 44 wherein the override torque assembly provides a plurality of different limited relative rotations between the first and second output shafts dependent upon the strength of the spring biasing the frictional disks in the drive between the outer housing and rotating member.

48. A limited slip differential comprising:
a rotating differential drivingly connected between two output shafts and a single rotating input; and
an override torque assembly located externally to the rotating differential including an outer housing secured to the rotating differential independently of the output shafts comprising:
a frictional drive between the rotating differential and one of the two output shafts;
wherein the frictional drive includes a spring arrangement consisting essentially of a single conical spring to limit the relative motion between the two output shafts.

49. The limited slip differential of claim 48 wherein the override torque assembly includes frictional disks and provides a plurality of different limited relative rotations between the first and second output shafts dependent upon the number of frictional disks in the override torque assembly.

50. The limited slip differential of claim 48 wherein the override torque assembly includes frictional disks and provides a plurality of different limited relative rotations between the first and second output shafts dependent upon the material characteristics of the frictional disks in the override torque assembly.

51. The limited slip differential of claim 48 wherein the override torque assembly includes frictional disks and provides a plurality of different limited relative rotations between the first and second output shafts dependent upon the strength of the spring in the override torque assembly.

* * * * *